United States Patent [19]

Pugel

[11] 4,256,430
[45] Mar. 17, 1981

[54] WHEEL CHANGE MECHANISM

[76] Inventor: Joseph P. Pugel, 937 S. 2nd St., Calimesa, Calif. 92320

[21] Appl. No.: 57,564

[22] Filed: Jul. 16, 1979

[51] Int. Cl.³ .......................................... B60B 29/00
[52] U.S. Cl. .......................................................... 414/428
[58] Field of Search ............ 414/426, 428; 254/8 R, 254/8 C

[56] References Cited

U.S. PATENT DOCUMENTS

| | | | |
|---|---|---|---|
| 2,485,797 | 10/1949 | Will | 414/428 |
| 2,551,483 | 5/1951 | Bartoe | 414/428 |
| 3,482,719 | 12/1969 | Sedgebeer | 414/428 |
| 3,828,955 | 8/1974 | Harkey | 414/428 |
| 3,847,294 | 11/1974 | Davenport | 414/428 |

*Primary Examiner*—Richard A. Schacher
*Attorney, Agent, or Firm*—Harvey S. Hertz

[57] ABSTRACT

A wheel change mechanism for aiding in lifting a tire onto and off of a vehicle. The wheel change mechanism compromises a base member which is movable along a support surface. Wheel support members extend from one end of the base member. A seat is positioned at the opposite end of the base member for pivoting the base member when a force is exerted thereon.

3 Claims, 3 Drawing Figures

WHEEL CHANGE MECHANISM

BACKGROUND OF THE INVENTION

(1) Field of the Invention

The field of art to which the invention pertains includes the field of wheel change mechanisms, particularly, with respect to a mechanism which utilizes body weight to lift a wheel onto or off of a vehicle.

(2) Description of the Prior Art

Conventional wheel change mechanisms which utilize fulcrum-type wheel changers are well known. However, it has been found that the forces needed to operate the fulcrum-type wheel changers are difficult for some people. In one patent, the knee may be used as a body weight to lift the tire by means of the wheel change mechanism. However, the obvious dangers of using a part of the body to exert such a force are apparent.

Known prior art includes U.S. Pat. Nos. 3,378,154; 2,208,162; 2,546,509; 2,570,587; 2,447,435; 1,892,979; and 3,463,337.

The present invention provides a novel, yet relatively simple wheel change mechanism incorporating a seat wherein the operator may use his body weight to operate a fulcrum and thereby remove a tire from a vehicle. The fulcrum is adjustable so that the pivot point of the wheel change mechanism can be used with various size vehicles, tires, and different body weights.

SUMMARY OF THE INVENTION

A wheel change mechanism for use in removing a tire from a vehicle. A base member is movable along a support surface. Wheel support members extend from one end of the base member. A seat is positioned at the opposite end of the base member for pivoting the base member when a force is exerted thereon.

The advantages of this invention, both as to its construction and mode of operation, will be readily appreciated as the same becomes better understood by reference to the following detailed description when considered in connection with the accompanying drawings in which like reference numerals designate like parts throughout the figures.

DESCRIPTION OF THE PREFERRED EMBODIMENTS

Figure 1:
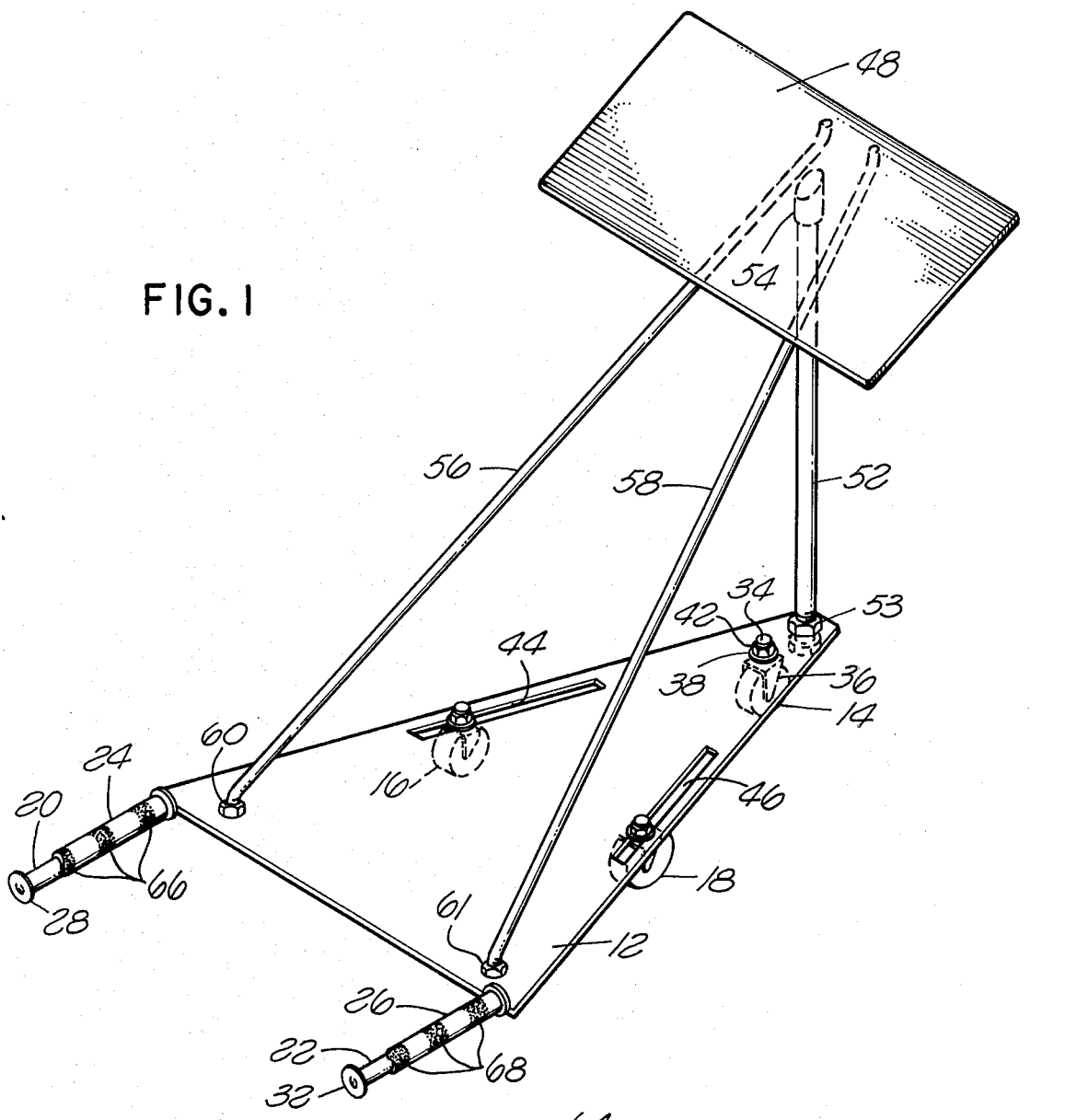
FIG. 1 is a perspective view of the wheel change mechanism.

Referring now to the drawings, there is shown in FIG. 1 a perspective view of the wheel change mechanism constructed in accordance with principles of the invention. The wheel change mechanism includes a generally triangular-shaped base plate 12. The base plate 12 is supported by means of a rear caster 14 at the triangle base apex and a pair of side casters 16 and 18 positioned adjacent opposite base plate side edges, respectively. The rear caster 14 and the side casters 16 and 18 enable the base plate 12 to be slidable movable along a floor.

Posts 20 and 22, which extend forwardly from opposite ends of the base plate triangular base can be positioned beneath a tire (not shown). The posts 20 and 22 have rotatable sleeves 24 and 26 positioned thereon enabling the tire to be rotated easily to a desired alignment for proper mounting on a vehicle. Fixed washers 28 and 32 adjacent the free end of the posts 20 and 22, respectively, prevent the freely rotatable sleeves 24 and 26 from being removed from the posts.

Normally, the rear caster 14 is fixed to the base plate 12 by means of a threaded shaft which extends from the top surface of the U-shaped caster housing 36 through an opening in the base plate 12. The shaft 34 is then secured to the base plate 12 by means of a conventional washer 38 and locking nut 42. Similarly, the side casters 16 and 18 are secured adjacent to the edges of the base plate 12, but may be adjustably positioned along slots 44 and 46, respectively. The slots 44 and 46 extend parallel to the side edges of the base plate 12 and determine the pivot point of the base plate as will be explained hereinafter.

A generally rectangular seat 48 is supported above the apex of the base plate 12 by means of a seat support arm 52. The seat 48 is slanted downwardly toward the posts 20 and 22. The seat support arm is threadably secured by means of nuts 53 at the base plate 12 apex and extends in a vertical position to the center of the bottom surface of the seat 48. The seat support arm 52 may be threadably secured into a flange 54 depending downwardly from the seat bottom surface enabling the rear seat to be removed from the base plate such as for storage purposes.

A pair of braces 56 and 58 extend from the bottom surface of the seat 48 on opposite sides of the arm 52 to the front end of the base plate 12. The braces 56 and 58 are secured by nuts 60 and 61, respectively, adjacent the posts 22 and 24 interconnection with the base plate, respectively. Typically, the ends of the braces 56 and 58 which are secured to the base plate 12, are threadably secured to the lock nut arrangement 60 and 61, enabling easy removal of the braces and the seat 48 from the base plate 12. The ends of the braces 56 and 58 adjacent the bottom surface of the seat 48 can be welded or otherwise secured thereto. Alternatively, of course, it should be understood that the braces 56 and 58 could be removable from the seat by means of a simple securing arrangement.

Figures 2, 3:
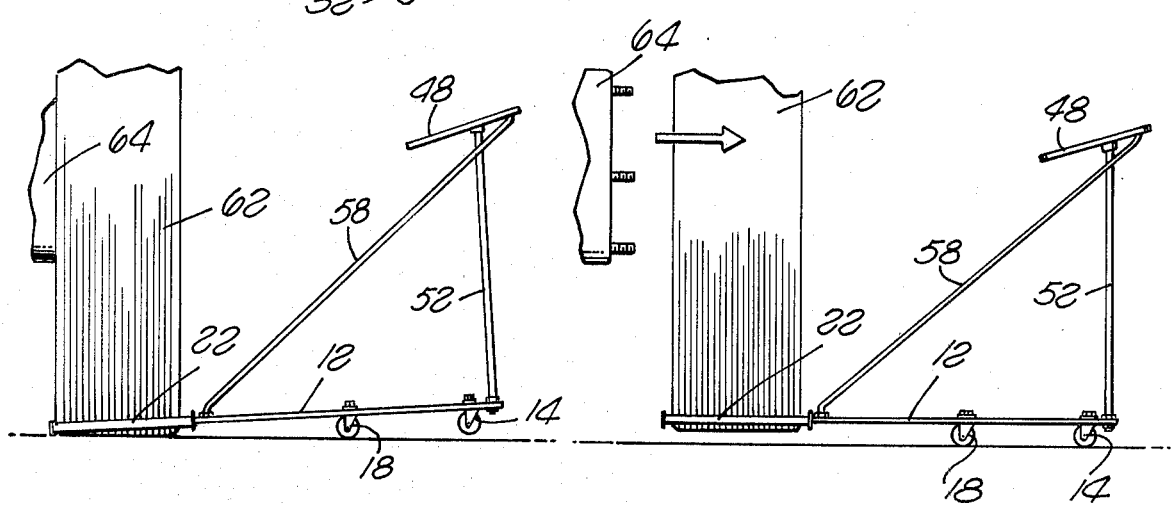
FIG. 2 is a side view of the wheel change mechanism of FIG. 1 illustrating the position of the wheel change mechanism adjacent a tire.
FIG. 3 is a side view of the wheel change mechanism of FIG. 2 illustrating the technique for lifting a tire.

Referring now to FIG. 2, it can be readily seen the posts 20 and 22 are positioned on opposite sides of the bottom surface of a tire 62 with the rear caster 14 raised above ground level. When a desired force such as the body weight of a person is placed on the seat 48, the wheel change mechanism base plate 12 will pivot about a plane defined by the side casters 16 and 18 until the rear caster 14 rests on the ground as shown in FIG. 3, enabling the tire to be lifted. The tire then can be removed from the wheel assembly 64. Alternatively, of course, the tire can be mounted by exerting a force on the seat and then moving the wheel change mechanism and the tire toward the wheel assembly 64.

It should be noted that the position of the side casters 16 and 18 determine the amount of upward movement of the posts 22 and 24 when lifting or removing a tire. The seat 48 slant prevents the body from slipping off the seat when a weight is exerted thereon and the assembly is tilted.

Further, the sleeves 24 and 26 can be coated with a non-slip surface 66 and 68, respectively, to allow limited rotation of the tire 62 thereon.

What is claimed is:

1. A wheel change mechanism comprising:

a base member movable along a support surface;

wheel support members extending from one end of said base member; and a seat supported at the opposite end of said base member for pivoting said base member when force is exerted thereon; and casters movable along the base for adjusting and defining the pivot plane of said base member.

2. A wheel change mechanism in accordance with claim 1 wherein said seat is capable of supporting the body weight of a person thereon.

3. A wheel change mechanism in accordance with claim 2 wherein said seat is slanted for preventing a person from slipping off said seat when pivoting said wheel change mechanism.

* * * * *